United States Patent [19]

Praetorius et al.

[11] 4,230,612
[45] Oct. 28, 1980

[54] POLYETHER LUBRICANTS FOR USE IN THE PROCESSING OF PLASTICS

[75] Inventors: Heinz Praetorius; Karl Seibert, both of Duren; Werner Holtvoigt, Lonne-Riessel, all of Fed. Rep. of Germany

[73] Assignee: Akzona Incorporated, Asheville, N.C.

[21] Appl. No.: 2,520

[22] Filed: Jan. 11, 1979

Related U.S. Application Data

[62] Division of Ser. No. 860,508, Dec. 14, 1977, Pat. No. 4,159,975.

[30] Foreign Application Priority Data

Dec. 16, 1976 [DE] Fed. Rep. of Germany ....... 2656927

[51] Int. Cl.$^3$ .................. C08G 65/08; C08L 27/06
[52] U.S. Cl. .................. 260/33.2 R; 525/91; 528/419; 568/624; 568/625
[58] Field of Search .................. 260/823, 33.2 R; 568/624, 625; 528/419; 525/91

[56] References Cited

U.S. PATENT DOCUMENTS

| | | | |
|---|---|---|---|
| 3,029,216 | 4/1962 | Bailey et al. | 260/42 |
| 3,637,869 | 1/1972 | Seizinger | 260/615 B |
| 3,829,506 | 8/1974 | Schmolka et al. | 260/615 B |

*Primary Examiner*—Earl A. Nielsen
*Attorney, Agent, or Firm*—Francis W. Young; Robert F. Green

[57] ABSTRACT

A lubricant for use in the processing of plastics is disclosed. The lubricant comprises a polyalkylene oxide made from a monomer selected from the group consisting of aliphatic, non-substituted, 1,2-alkylene oxides containing from about six to about 40 carbon atoms, and mixtures thereof, said polyalkylene oxide having an average molecular weight from about 1,000 to about 6,000. Also disclosed is a process for using such lubricants in the shaping of thermoplastic polymers.

6 Claims, No Drawings

POLYETHER LUBRICANTS FOR USE IN THE PROCESSING OF PLASTICS

This is a division, of application Ser. No. 860,508, filed Dec. 14, 1977 now U.S. Pat. No. 4,159,975 issued July 3, 1979.

BACKGROUND OF THE INVENTION

This invention relates to lubricants for use in the processing of plastics, and in particular, to lubricants for use during the shaping of thermoplastic polymers.

In the known methods for processing thermoplastic polymers, shaping is carried out under high temperature and pressure loads. The heated plastic mass tends to adhere to heated machinery parts, especially when the processing of the thermoplastic materials involves injection molding, extruding, calendering or rolling. The adhering material thus has a longer dwell time in the machines, as a result of which thermal degradation of the thermoplastic polymer occurs, which may thus require interruption of a processing operation. When polyvinyl chloride is processed, a result of the thermal degradation in combination with the limited useful life of typical stabilizers, may be the splitting off of hydrochloric acid.

In order to avoid the foregoing processing difficulties, auxiliary processing agents are typically added to the plastic powder in addition to the customary stabilizers, the agents tending to facilitate the flow of the melted mass and to eliminate adhering of the plastic to the heated surfaces of the machinery parts.

Typical auxiliary processing agents include lubricants and flowing aids which are added to the thermoplastic polymer. In the case of lubricants, one may differentiate between internal and external lubricants. The internal lubricants are intended to serve an increase in melting velocity and in their case a reduction in internal friction, thus a certain internal lubrication is important, which presupposes an adequate compatibility of a lubricant with a plastic. External lubricants, sometimes also referred to as parting agents, serve to prevent adhering to the hot machinery parts and in such a case, less compatibility with a plastic is required, so that the lubricant will difuse between the plastic material and the heated machinery parts, and thus cause a lubricating effect at the interphase between the metal and the melt.

Wax esters, such as the cetyl ester of palmitic acid, fatty alcohols, as well as fatty acid partial esters of glycerine, such as glycerine mono-oleate, are known to be excellent internal lubricants. Among the external lubricants with good parting effect are fatty acids, fatty acid amides, fatty acid esters, lower alcohols, natural parafin hydrocarbons, and hardened glycerides. Polyalkylene oxides of low 1,2-alkylene oxide have already been proposed as lubricants. In German Pat. No. 1,133,544, the use of polyethylene oxides as lubricants in the manufacture, without plasticizer, of rolled film made of vinyl chloride polymers and copolymers is described. In addition to polyethylene oxide, the corresponding British Pat. No. 887,353 also mentions polypropylene oxide, as well as copolymers of ethylene oxide and propylene oxide as suitable lubricants. Japanese Pat. No. 43-26088 teaches the use of polyisobutylene oxide, with a reduced viscosity of at most 1.5, as a processing aid in the processing of polyvinyl chloride. However, lubricants such as the foregoing are suitable only for narrow fields of application, so that the previously utilized conventional lubricants, such as wax esters, fatty alcohols, fatty acid amides, fatty acid esters, as well as their combinations, continue to find wide application.

Selection and dosage of the lubricant depend primarily upon the temperature and pressure stresses prevailing during processing, but aso upon the characteristics of the other components of the mixture, as well as upon the desired characteristics of the finished product. For practicing certain processing methods, one may be forced to use combinations of several lubricant types, as each lubricant is typically designed for accomplishing only one specific goal. However, despite the possibility of improving the characteristics of one lubricant through combination thereof with another lubricant, it is unavoidable that products with overlapping characteristics will result from the mixture. The necessity of developing a special mixture for a special case, which is by no means a rare occurrence, involves considerable expenditure for the processor. Nevertheless, even if lubricant combinations are utilized, incompatibility effects, such as "blooming," cannot be avoided, if one maintains the minimum quantities of lubricant required to attain adequate freedom from adhesion.

An object of the present invention, therefore, is to provide a lubricant which, in its actions as an internal and external lubricant, can be adjusted in such a way that there will be no risk of incompatibility, and optimal processing conditions will be made possible.

SUMMARY OF THE INVENTION

The foregoing object, and others, are achieved by providing a lubricant for use in processing thermoplastic polymers, comprising a polyalkylene oxide made from a monomer selected from the group consisting of aliphatic, non-substituted, 1,2-alkylene oxides containing from about 6 to about 40 carbon atoms, and mixtures thereof, said polyalkylene oxide having an average molecular weight from about 1,000 to about 6,000.

The foregoing object, and others, may also be achieved by providing a lubricant for use in processing thermoplastic polymers, comprising a block copolymer comprised of blocks of polyalkylene oxide made from a monomer selected from the group consisting of aliphatic, non-substituted 1,2-alkylene oxides containing from about 6 to about 40 carbon atoms, and mixtures thereof, and blocks of polyethylene oxide or polypropylene oxide, or mixtures thereof, the polyalkylene oxide being present in an amount of from about 10% to about 95%, by weight, based on the total weight of the block copolymer, and the block copolymer having an average molecular weight from about 1,500 to about 10,000.

The present invention also provides an improved method for processing thermoplastic polymers in which said polymers are shaped by subjecting said polymers to high temperature and pressure conditions, the improvement comprising adding to said polymers, prior to subjecting them to said high temperature and pressure conditions, from about 0.05% to about 2%, based on the weight of the polymer, of a lubricant comprising a polyalkylene oxide made from a monomer selected from the group consisting of aliphatic, non-substituted, 1,2-alkylene oxides containing from about 6 to about 40 carbon atoms, and mixtures thereof, said polyalkylene oxide having an average molecular weight from about 1,000 to about 6,000.

The present invention also provides an improved method for processing thermoplastic polymers in which said polymers are shaped by subjecting said polymers to high temperature and pressure conditions, the improvement comprising adding to said polymers prior to subjecting them to said high temperature and pressure conditions, from about 0.05% to about 2%, based on the weight of the polymer, of a lubricant comprising a block copolymer comprised of blocks of polyalkylene oxide made from a monomer selected from the group consisting of aliphatic, non-substituted, 1,2-alkylene oxides containing from about 6 to about 40 carbon atoms, and mixtures thereof, and blocks of polyethylene oxide or polypropylene oxide or mixtures thereof, the polyalkylene oxide being present in an amount from about 10% to about 95%, by weight, based on the total weight of the block copolymer, and the block copolymer having an average molecular weight from about 1,500 to about 10,000.

DETAILED DESCRIPTION OF THE INVENTION

Suitable monomeric aliphatic, non-substituted, 1,2-alkylene oxides, for use in practicing the present invention include 1,2-epoxyhexane; 1,2-epoxyheptane; 1,2-epoxyoctane; 1,2-epoxynonane; 1,2-epoxydecane; 1,2-epoxyundecane; 1,2-epoxydodecane; 1,2-epoxytridecane; 1,2-epoxytetradecane; 1,2-epoxypentadecane; 1,2-epoxyhexadecane; 1,2-epoxyheptadecane; 1,2-epoxyoctadecane; 1,2-epoxynonadecane; 1,2-epoxyicosane; 1,2-epoxyunicosane; 1,2-epoxydocosane; 1,2-epoxytricosane; 1,2-epoxytetracosane; 1,2-epoxypentacosane; 1,2-epoxyhexacosane; 1,2-epoxyheptacosane; 1,2-epoxyoctacosane; 1,2-epoxynonacosane; 1,2-epoxytriacontane; 1,2-epoxyuntriacontane; 1,2-epoxydotriacontane; 1,2-epoxytritriacontane; 1,2-epoxyptetratriacontane; 1,2-epoxypentatriacontane; 1,2-epoxyhexatriacontane; 1,2-epoxyheptatriacontane; 1,2-epoxyoctatriacontane; 1,2-epoxynonatriacontane; and 1,2-epoxytetracontane.

1,2-alkylene oxides with from about 10 to about 20 carbon atoms in the monomeric molecule have been found to be especially suitable. Good lubricants pursuant to the present invention may be obtained if the average molecular weight of the 1,2-alkylene oxide polymers is from about 1,000 to about 6,000, preferably from about 2,000 to about 3,000. The average molecular weights referred to in this application, unless otherwise indicated, are determined with the aid of gel permeation chromatography in microStyragel columns (company publication A.N. 143, June 1974 of Waters Associates).

Especially desirable lubricants, in which the internal and external lubricating effects may be adjusted especially well, are block copolymers made from polymeric blocks derived from aliphatic, unsubstituted, 1,2-alkylene oxides containing from about 6 to about 40 carbon atoms, and blocks of ethylene oxide or propylene oxide, or mixtures thereof. Preferably, the ethylene oxide and/or propylene oxide constituent amounts to from about 5 to about 90%, by weight, and the 1,2-alkyene oxide constituent amounts to from about 95 to about 10%, by weight, based on the total weight of the block copolymer. Thereby, the average molecular of the block copolymer is from about 1,500 to about 10,000, determined by means of gel permeation chromatography.

The lubricants pursuant to the present invention may contain up to about 5% by weight of other unpolymerized monomers, without impairment of their effectiveness. Preparation of the 1,2-epoxy polymers is carried out in a known manner, by means of polymerization in the presence of alkaline catalysts. Alkali hydroxides and basic salts are especially well suited. It has been found to be especially advantageous if such catalysts are left in the finished product. The consistency of the product is pasty to wax-like.

In order to obtain the block polymers, the polymeric 1,2-alkylene oxides containing from about 6 to about 40 carbon atoms are reacted with ethylene oxide, propylene oxide, or mixtures thereof, or with polyethylene glycol, or polypropylene glycol, in the presence of an alkaline catalyst.

The lubricants pursuant to the the present invention exert a regulating influence on the processing conditions, in quantities which are considerably smaller than that required with conventional lubricants and permit a high degree of freedom from adhesion during shaping, without the occurrence of any incompatibility phenomena. The addition of lubricants amounts to 0.05 to 2% by weight, based on the quantity, by weight, of the plastic.

The films and bottles made by using the lubricants pursuant to the present invention display high transparency and a smooth surface. In the case of these, as well as of other methods of processing, the mechanical characteristics of the products are at least equal, or improved.

The lubricants of the present invention may advantageously be added to all plastics, in particular to thermoplastic materials. However, they are especially well suited for the processing of polymers containing chlorine, such as polyvinyl chloride, polyvinylidene chloride, and mixed vinyl chloride polymers, whereby differences in the K value of the polyvinly chloride types have less effect than in the case of conventional lubricants. The K value of polyvinyl chlorides is defined as "$10^3 K$ from the equation $\log_{10}/c = (75K^2)/(1+1.5K.C)+K$" (see "Encyclopedia of Polymer Science and Technology, 1971, Vol. 14, Page 517).

The applicability of the lubricants pursuant to the present invention is not limited by the nature of the stabilizers and other additives used during processing. If necessary, the lubricants of the present invention may also be added in so-called mono-component stabilizers. The addition of the lubricants pursuant to the inention can be made in such a way, that they are added to the molding batch to be processed before molding. The lubricant may be added to the finished polymer, or also to the monomers before polymerization. Homogenizing of the mixture consisting of lubricants, plastic powder, and the other additions, such as stabilizers, fillers, and pigments, may be performed in a known manner, in a heating-cooling mixture, in a set of mixing rollers, in a masticater, or in an extruder.

The present invention is further exemplified in the follwing non-limiting examples:

EXAMPLES

Examples 1 to 3 describe typical methods of preparation for the polyalkylene oxide lubricants pursuant to the invention.

Examples 4 to 8 show the application of lubricants pursuant to the invention with different mixing formulations and polyvinylchloride (PVC) types, and the effects resulting therefrom.

Examples 9 to 15 show the application of lubricants from polyalkylene oxides pursuant to the invention, the monomers of which display different chain lengths.

Application was carried out in the same manner as described in Example 4.

Examples 16 to 21 illustrate the influence of the average molecular weight of the lubricant pursuant to the invention in case of application pursuant to Example 4.

Finally, Examples 22 to 25 show the process of the block copolymers pursuant to the invention in case of application in keeping with Example 4. This involves block copolymers of 1,2-epoxydodecane and ethylene oxide in a weight ratio of 1:10 with different molecular weights.

EXAMPLE 1

Polymerization of 1,2-Epoxydodecane

A stainless steel reactor with agitator, thermometer and cooler was charged with 7.5 kg of 1,2-epoxydodecane (40.8 mol) and 37.5 g of 88/92% industrial grade caustic potash, flushed with dry nitrogen while being agitated, heated to 120° C. and kept at this temperature for 60 minutes under a vacuum (20 Torr). This was followed by heating to 190° C. in 30 minutes. Within 30 minutes, the total quantity of epoxy material had been converted to polyalkylene oxide. After cooling to room temperature, the reaction product was a white, pasty mass. The molecular weight of this polyalkylene oxide compound was 2,100 (determined by means of gel permeation chromatography).

EXAMPLE 2

Polymerization of 1,2-Epoxyalkanes

A three-necked, round-bottomed flask with agitator, thermometer and reflux cooler was charged with 200 g of a mixture of 1,2-alkylene oxides (28% 1,2-epoxypentadecane+28% 1,2-epoxyhexadecane+28% 1,2-epoxyheptadecane+16% 1,2-epoxyoctadecane) and 1.0 g of 88/92% industrial grade caustic potash, flushed with dry nitrogen while being agitated and, after a brief vacuum treatment (20 Torr), heated to 140° C. in 30 minutes. Within 6 hours, the total quantity of epoxy material had become converted to polyalkylene oxide. At an elevated temperature (50°–60° C.), the reaction product had the form of a colorless, clear liquid which, upon cooling to room temperature, became a solid mass. The average molecular weight of this polyalkylene oxide compound (determined by means of gel permeation chromatography) was 1,300.

EXAMPLE 3

Block Copolymerization of 1,2-Epoxydodecane and Ethylene Oxide

A stainless steel autoclave with agitator and thermometer was charged with 2.2 kg of 1,2-epoxydodecane (12 mol) and 11 g of 88/92% industrial grade caustic potash, and flushed with dry nitrogen while being agetated. Closing of the equipment was followed by heating to 120° C., which temperature was maintained for 1 hour under a vacuum (20 Torr). After that, the temperature was incresed to 190° C. in 20 minutes. The entire quantity of epoxy material had become converted to polyalkylene oxide within 45 minutes. Subsequently, 190° C. was maintained for 15 minutes under a vacuum (20 Torr), whereupon 5.26 kg ethylene oxide (119.5 mol) were introduced at this temperature within 2 hours. After cooling to room temperature, the reaction product was a white, solid mass, which had an average molecular weight of about 5,000 and a melting range from 58° to 62° C.

The gel permeation chromatography used in the case of the examples involves a high-pressure separation-chromatographical method, in which a mixture is separated in keeping with its molecular weight. A relationship exists between retention time and molecular weight, so that the molecular weight can be determined by means of calibrating substances. In the measurements for the examples, polyethylene glycols of varying molecular weights were used as calibrating substances. Otherwise, tetrahydrofuran was used as mobile phase and a differetial refractomter served as detector. The column was a micro Styragel column of the fire Waters Associates, as described in their company publication AN 143 of June, 1974.

The lubricants prepared in keeping with Examples 1 to 3 were subjected to an endurance test at 180° C. in hard PVD, injection molding, shaping and bottle formulations.

The "parts" indicated in the Examples are "parts by weight."

EXAMPLE 4

One hundred (100) parts of a dispersion polyvinyl chloride (K value 70), 1 part octyl tin sulfide stabilizer, 0.15 parts spermaceti as lubricant (a), 0.15 parts of the lubricant combination spermaceti+paraffin (b), or 0.15 parts of the product from Example 1 with a molecular weight of 2,100, or 0.15 parts of the product from Example 3, with a molecular weight of 5,000, are subjected to premixing for one minute in a high-speed laboratory mixer. The mixture is plasticized for about 10 minutes at a temperature of 180° C. on a 2-roller laboratory rolling mill with a roll diameter of 110×225 mm, a gap width of 0.8 to 1 mm and a speed of about 20 rpm, whereupon the duration of rolling at 180° C. was determined until the breakdown of lubrication (adhering to the rollers) and/or the breakdown of stability (complete blackening of the film when the degradation point is reached).

EXAMPLE 5

Mixtures were examined, which had the same formulation as indicated in Example 4, except that use was made of a dispersion polyvinyl chloride with a K value of 55.

EXAMPLE 6

One hundred (100) parts mass of polyvinyl chloride K value 57), 2.16 parts tetrabasic lead sulfate, 0.21 parts dibasic lead stearate, 0.21 parts calcium stearate, as well as 2.40 parts of the lubricant combination fatty acid ester+paraffin+fatty alcohol and the same stabilizer combination with addition of only 0.25 parts of the product pursuant to the invention from Example 1 (MW 2,100) were premixed, plasticized and subjected to an endurance rolling test in the same manner as indicated in Example 4.

EXAMPLE 7

One hundred (100) parts of a dispersion of polyvinyl chloride (K value 60), 3.00 parts dialkyl tin maleate ester, 1.00 part fatty alcohol, 0.25 parts glycerin monooleate, 2 parts flowing aid, 0.33 parts E wax and 0.12 parts polyethylene wax, as well as the same formulation without fatty alcohol and glycerin monooleate, but with addition of 0.15 parts of the product pursuant to the invention from Example 1 (MW 2,100) were premixed, plasticized and subjected to an endurance rolling test in the same manner as indicated in Example 4.

EXAMPLE 8

One hundred (100) parts mass of polyvinyl chloride (K value 57), 1.00 part octyl tin sulfide, 1.50 parts flowing aid, 1 part of a commercially available combination lubricant or, in comparison therewith, 0.15 parts of the product pursuant to the invention, from Example 1 with a molecular weight of 2,100 were, as in the preceding Examples, premixed, plasticized and subjected to an endurance test.

It was found that, with an additive quantity of only 0.15 parts, as compared with 1.15 parts as required with lubricant combinations needed pursuant to the state of the art, the polyalkylene oxide pursuant to the invention results in a better freedom from adhesions.

The following Tables clearly show the superior effectiveness of the lubricants pursuant to the invention.

TABLE 1

RESULTS OF THE APPLICATION OF EXAMPLES 4-8

| Example No. | Total Addition of Lubricants from the State of the Art Parts per weight per 100 parts PVC | Addition of Polymer from Example 1 Parts per weight per 100 parts PVC | Addition of Block Copolymer from Example 3 Parts per weight per 100 parts PVC | Breakdown of Stability in minutes | Adhesion to the Set of Rollers after # of minutes |
|---|---|---|---|---|---|
|   | 0.05 (a) | — | — | ~ | 43 |
|   | 0.15 (b) | — | — | — | 43 |
| 4 | — | 0.15 | — | 130 | does not adhere |
|   | — | — | 0.15 | 130 | does not adhere |
|   | 0.15 (a) | — | — | not feasible | — |
|   | 0.15 (b) | — | — | — | 19 |
| 5 | — | 0.15 | — | 60 | does not adhere |
|   | — | — | 0.15 | — | 69 |
|   | 2.40 | — | — | 50 | does not adhere |
| 6 | — | 0.25 | — | 80 | does not adhere |
|   | 1.70 | — | — | — | 140 |
| 7 | 0.45 | 0.15 | — | 180 | does not adhere |
|   | 1.15 | — | — | — | 65 |
| 8 | — | 0.15 | — | — | 70 |

TABLE 2

RESULTS OF THE APPLICATION OF EXAMPLES 9-15

| Example No. | 1,2-alkylene oxide monomer | KOH catalyst % by weight | Fp °C. | Average molecular weight | Breakdown of stability | Adhesion to the Set of Pollers after # of minutes |
|---|---|---|---|---|---|---|
| 9 | 1,2-epoxyoctane | 0.5 | liquid | 1900 | — | 109 |
| 10 | 1,2-epoxydecane | 0.05 | liquid | 2400 | 110 | does not adhere |
| 11 | 1,2-epoxydodecane | 0.05 | pasty | 2450 | 150 | does not adhere |
| 12 | 1,2-epoxytetradecane | 0.05 | 35-37 | 2400 | 140 | does not adhere |
| 13 | 1,2-epoxyhexadecane | 0.5 | 51-58 | 2600 | 130 | does not adhere |
| 14 | 1,2-epoxyoctadecane | 0.5 | 62-70 | 3800 | 110 | does not adhere |
| 15 | 1,2-epoxyicosane | 0.5 | 63-66 | 1850 | 110 | does not adhere |

TABLE 3

RESULTS OF THE APPLICATION OF EXAMPLES 16-21

| Example No. | KOH catalyst % by weight | FP °C. | Average molcular weight | Breakdown of stability in minutes | Adhesion to the set of rollers after # of minutes |
|---|---|---|---|---|---|
| 16 | 0.05 | 25-55 | 500 | — | 25 |
| 17 | 0.25 | pasty | 1280 | — | 109 |
| 18 | 0.2 | pasty | 2000 | 130 | does not adhere |
| 19 | 0.5 | 34-40 | 2450 | 140 | does not adhere |
| 20 | 0.2 | pasty | 3400 | 120 | does not adhere |
| 21 | 0.25 | 31-39 | 4500 | — | 99 |

TABLE 4

RESULTS OF THE APPLICATION OF EXAMPLES 22-25

| Example No. | KOH catalyst % by weight | Fp °C. | Average molecular weight | Breakdown of stability in minutes | Adhesion to the set of rollers after # of minutes |
|---|---|---|---|---|---|
| 22 | 0.15 | 59-64 | 3000 | 140 | does not adhere |
| 23 | 0.15 | 53-58 | 4580 | 130 | does not adhere |
| 24 | 0.15 | 46-48 | 5900 | 130 | does not adhere |
| 25 | 0.15 | 58-62 | 9500 | 110 | does not adhere |

The foregoing Examples thus unequivocally show the good freedom from adhesion effect of the lubricants pursuant to the present invention. Such advantages are especially apparent in those examples in which the films did not adhere, even some time after the decline in thermostability.

What is claimed is:

1. A lubricant for use in processing thermoplastic polymers comprising a block copolymer comprised of blocks of polyalkylene oxide made from a monomer selected from the group consisting of aliphatic, non-substituted, 1,2-alkylene oxides containing from about 6 to about 40 carbon atoms, and mixtures thereof, and blocks of polyethylene oxide or polypropylene oxide, or mixtures thereof, the polyalkylene oxide being present in an amount of from about 10% to about 95%, by weight, based on the total weight of the block copolymer, and the block copolymer having an average molecular weight of from about 1,500 to about 10,000.

2. A composition comprising a thermoplastic polymer and from about 0.05 to about 2.0 percent, based on the weight of the polymer, of a block copolymer lubricant comprised of blocks of polyalkylene oxide made from a monomer selected from the group consisting of aliphatic, non-substituted, 1,2-alkylene oxides containing from about 6 to about 40 carbon atoms, and mixtures thereof, and blocks of polyethylene oxide or polypropylene oxide, or mixtures thereof, the polyalkylene oxide being present in an amount of from about 10% to about 95%, by weight, based on the total weight of the block copolymer, and the block copolymer having an average molecular weight of from about 1,500 to about 10,000.

3. The composition of claim 2 wherein the 1,2-alkylene oxide is selected from the group consisting of 1,2-epoxyhexane; 1,2-epoxyheptane; 1,2-epoxyoctane; 1,2-epoxynonane; 1,2-epoxydecane; 1,2-epoxyundecane; 1,2-epoxydodecane; 1,2-epoxytridecane; 1,2-epoxytetradecane; 1,2-epoxypentadecane; 1,2-epoxyhexadecane; 1,2-epoxyheptadecane; 1,2-epoxyoctadecane; 1,2-epoxynonadecane; 1,2-epoxyicosane; 1,2-epoxyuniconsane; 1,2-epoxydocosane; 1,2-epoxytricosane; 1,2-epoxytetracosane; 1,2-epoxypentacosane; 1,2-epoxyhexacosane; 1,2-epoxyheptacosane; 1,2-epoxyoctacosane; 1,2-epoxynonacosane; 1,2-epoxytriacontane; 1,2-epoxyuntriacontane; 1,2-epoxydotriacontane; 1,2-epoxytritriacontane; 1,2-epoxytetratriacontane; 1,2-epoxypentatriacontane; 1,2-epoxyhexatriacontane; 1,2-epoxyheptatriacontane; 1,2-epoxyoctatriacontane; 1,2-epoxynonatriacontane; and 1,2-epoxytetracontane.

4. The composition of claim 3 wherein the thermoplastic polymer is selected from the group consisting of polyvinyl chloride, polyvinylidene chloride, and mixed vinyl chloride polymers.

5. The composition of claim 2 wherein the thermoplastic polymer is selected from the group consisting of polyvinyl chloride, polyvinylidene chloride, and mixed vinyl chloride polymers.

6. The composition of claim 1 wherein the 1,2-alkylene oxide is selected from the group consisting of 1,2-epoxyhexane; 1,2-epoxyheptane; 1,2-epoxyoctane; 1,2-epoxynonane; 1,2-epoxydecane; 1,2-epoxyundecane; 1,2-epoxydodecane; 1,2-epoxytridecane; 1,2-epoxytetradecane; 1,2-epoxypentadecane; 1,2-epoxyhexadecane; 1,2-epoxyheptadecane; 1,2-epoxyoctadecane; 1,2-epoxynonadecane; 1,2-epoxyicosane; 1,2-epoxyunicosane; 1,2-epoxydocosane; 1,2-epoxytricosane; 1,2-epoxytetracosane; 1,2-epoxypentacosane; 1,2-epoxyhexacosane; 1,2-epoxyheptacosane; 1,2-epoxyoctacosane; 1,2-epoxynonacosane; 1,2-epoxytriacontane; 1,2-epoxyuntriacontane; 1,2-epoxydotriacontane; 1,2-epoxytritriacontane; 1,2-epoxytetratriacontane; 1,2-epoxypentatriacontane; 1,2-epoxyhexatriacontane; 1,2-epoxyheptatriacontane; 1,2-epoxyoctatriacontane; 1,2-epoxynonatriacontane; and 1,2-epoxytetracontane.

* * * * *